(12) United States Patent
Yamamoto

(10) Patent No.: US 8,432,360 B2
(45) Date of Patent: Apr. 30, 2013

(54) INPUT APPARATUS, METHOD AND PROGRAM

(75) Inventor: Kazuyuki Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 683 days.

(21) Appl. No.: 12/628,526

(22) Filed: Dec. 1, 2009

(65) Prior Publication Data

US 2010/0171695 A1 Jul. 8, 2010

(30) Foreign Application Priority Data

Jan. 6, 2009 (JP) ................................. 2009-000786

(51) Int. Cl.
*G09G 5/08* (2006.01)
(52) U.S. Cl.
USPC ............................. 345/163; 345/158; 345/157
(58) Field of Classification Search ........................ None
See application file for complete search history.

(56) References Cited

U.S. PATENT DOCUMENTS

| | | | |
|---|---|---|---|
| 4,939,974 A | | 7/1990 | Ishida et al. |
| 6,097,374 A | * | 8/2000 | Howard ........................ 345/168 |
| 7,145,549 B1 | * | 12/2006 | Sun ............................... 345/157 |

FOREIGN PATENT DOCUMENTS

| | | |
|---|---|---|
| JP | 6-7331 | 1/1994 |
| JP | 2008-52573 | 3/2008 |
| JP | 2008-92330 | 4/2008 |

OTHER PUBLICATIONS

U.S. Appl. No. 12/631,948, filed Dec. 7, 2009, Niikura, et al.
U.S. Appl. No. 12/637,005, filed Dec. 14, 2009, Yamamoto et al.
U.S. Appl. No. 12/687,401, filed Jan. 14, 2010, Yamamoto et al.
U.S. Appl. No. 12/636,938, filed Dec. 14, 2009, Yamamoto et al.

* cited by examiner

*Primary Examiner* — Andrew L Sniezek
(74) *Attorney, Agent, or Firm* — Oblon, Spivak, McClelland, Maier & Neustadt, L.L.P.

(57) ABSTRACT

An input apparatus includes: an operation section operated by a user for generating a corresponding value corresponding to a motion of an image displayed on a screen of an image display section of an electronic apparatus; a detection section detecting a detection value for generating the corresponding value corresponding to the motion of the image by an operation of the operation section; a calculation section calculating the corresponding value from the detection value detected by the detection section; a transmission section transmitting the corresponding value calculated by the calculation section to the electronic apparatus by a radio wave; and a capture section capturing the detection value detected by the detection section from the detection section in a time period when the corresponding value is not transmitted to the electronic apparatus by the radio wave.

11 Claims, 14 Drawing Sheets

INPUT APPARATUS, METHOD AND PROGRAM

BACKGROUND OF THE INVENTION

1. Field of the Invention

The present invention relates an input apparatus, method, and program. In particular, the present invention relates to an input apparatus, method, and program which prevents detection of noise caused by radio waves.

2. Description of the Related Art

In general, a mouse attached to a personal computer is operated on a desk. When a user operates a mouse on a desk, a relative motion is detected and a pointer is moved and displayed in the direction corresponding to the motion. However, it becomes necessary for such a mouse to have a plane for the operation, and thus a use environment is restricted.

Accordingly, there has been a proposal which allows a user to move a mouse in any direction in a three-dimensional free space so as to move a pointer in the operated direction (for example, Japanese Examined Patent Application Publication No. 6-7371).

Although a mouse is operated in a free space, if the operation signal thereof is transmitted to a personal computer through a signal line, the use environment is restricted after all. Thus, it is thought that the operation signal is transmitted by radio communication.

If the operation signal is transmitted by infrared rays, the signal line becomes unnecessary. However, infrared rays have directivity, and thus it is difficult for a mouse that is operated in any direction in a free space to transmit an operation signal to the direction of a personal computer.

Also, it is also thought that a plurality of LEDs (Light Emitting Diodes) that emit infrared rays are disposed in many directions. However, in that case, the power consumption becomes large, the mouse becomes large in size, and the cost becomes high. Also, the transmission bit rate is low, and thus it is difficult to transmit xy-coordinates in real time.

Accordingly, it is thought that a mouse transmits the operation signal to a personal computer by a radio wave.

SUMMARY OF THE INVENTION

When a mouse is operated in a free space in three dimensions, inertia sensors, such as an angular velocity sensor, an acceleration sensor, etc., are accommodated in the mouse. At this time, a radio wave transmitted from the mouse as an operation signal becomes radio noise for an inertia sensor built in the mouse, and large noise may be generated on a detection signal. For example, an angular velocity sensor has a built-in IC including an amplifier amplifying a detection signal by hundreds of times to thousands of times in order to detect a weak Coriolis force. It is therefore difficult to extract only a signal component by a filter if the influence of external radio waves is large.

Also, in the above-described mouse, it is thought that miniaturization will be carried out in the future. In that case, it becomes difficult to separately dispose an antenna and an angular velocity sensor after all, and thus the influence of radio noise will increase further.

The present invention has been made in view of such circumstances. It is desirable to make it possible to prevent detection of noise caused by radio waves.

According to an embodiment of the present invention, there is provided an input apparatus including: an operation section operated by a user for generating a corresponding value corresponding to a motion of an image displayed on a screen of an image display section of an electronic apparatus; a detection section detecting a detection value for generating the corresponding value corresponding to the motion of the image by an operation of the operation section; a calculation section calculating the corresponding value from the detection value detected by the detection section; a transmission section transmitting the corresponding value calculated by the calculation section to the electronic apparatus by a radio wave; and a capture section capturing the detection value detected by the detection section from the detection section in a time period when the corresponding value is not transmitted to the electronic apparatus by the radio wave.

In an embodiment of the present invention, an operation section is operated by a user in order to generate a corresponding value corresponding to a motion of an image displayed on a screen of an image display section of an electronic apparatus. A detection section detects a detection value for generating the corresponding value corresponding to the motion of the image by the operation of the operation section. A capture section captures the detected detection value detected by the detection section from the detection section in a time period when the corresponding value is not transmitted to the electronic apparatus by a radio wave. A calculation section calculates the corresponding value from the detection value detected by the detection section. A transmission section transmits the corresponding value calculated by the calculation section to the electronic apparatus by the radio wave.

As described above, by an embodiment of the present invention, it is possible to prevent detection of noise caused by radio waves.

DESCRIPTION OF THE PREFERRED EMBODIMENTS

In the following, a description is given of a best mode for carrying out the invention (hereinafter referred to as an embodiment). In this regard, a description will be given in the following order.

Figure 1:
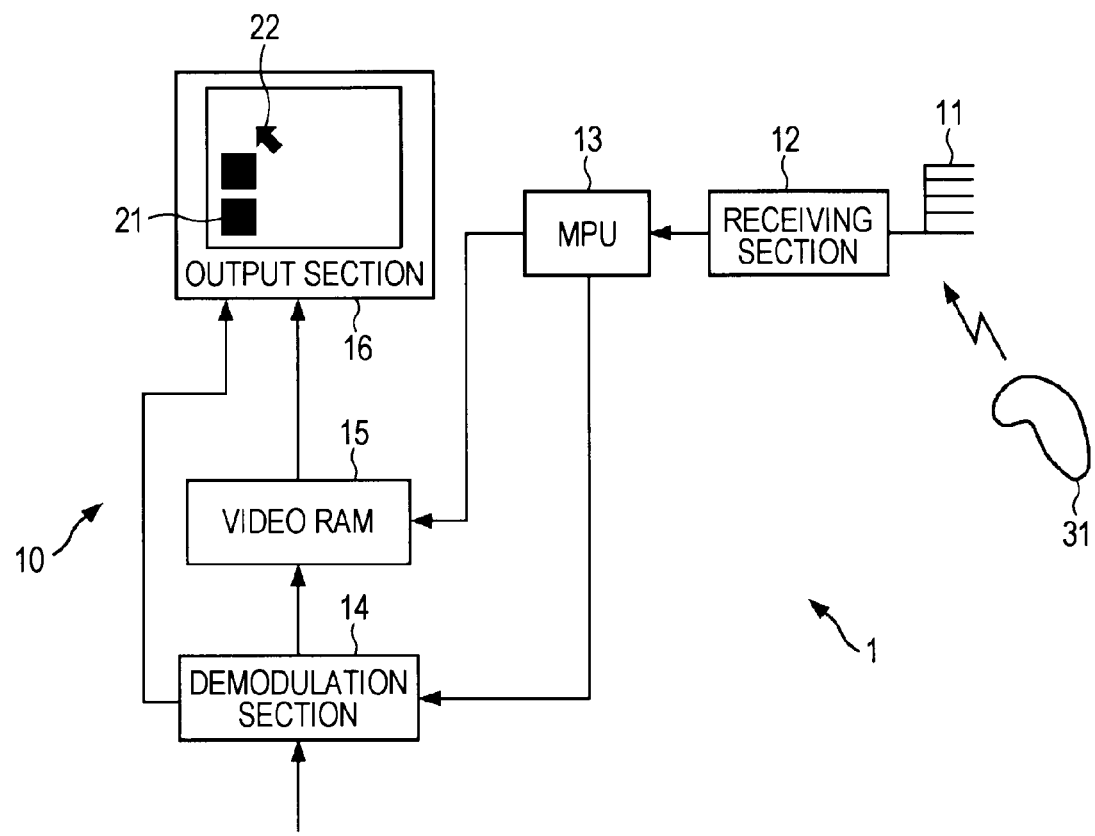
FIG. 1 is a block diagram illustrating a configuration of an input system according to an embodiment of the present invention.

1. First embodiment (system configuration)
2. First embodiment (configuration of input apparatus)
3. First embodiment (electrical configuration of input apparatus)
4. First embodiment (functional configuration of MPU of input apparatus)
5. First embodiment (operation of input apparatus)
6. First embodiment (corresponding-value calculation processing)
7. Second embodiment (functional configuration of MPU of input apparatus)
8. Second embodiment (operation of input apparatus)
9. Variations
1. First Embodiment
System Configuration FIG. 1 illustrates a configuration of an input system according to an embodiment of the present invention.

The input system 1 includes a television receiver 10 as an electronic apparatus to be controlled, and an input apparatus 31 as a pointing device or a remote controller for remotely controlling the electronic apparatus.

The television receiver 10 includes an antenna 11, a receiving section 12, an MPU (Micro Processing Unit) 13, a demodulation section 14, a video RAM (Random Access Memory) 15, and an output section 16.

The antenna 11 receives a radio wave from the input apparatus 31. The receiving section 12 demodulates the radio wave received through the antenna 11, and outputs the signal to the MPU 13. The MPU 13 controls each section on the basis of an instruction from the input apparatus 31.

The demodulation section 14 demodulates a television broadcasting signal received through an antenna not shown in the figure, outputs a video signal to the video RAM 15, and outputs an audio signal to the output section 16. The video RAM 15 combines an image based on the video signal supplied from the demodulation section 14 and an image of on-screen data, such as a pointer, icon, etc., from the MPU 13, and outputs the image to a image display section of the output section 16. The output section 16 displays an image on the image display section, and outputs sound of the audio signal corresponding to the video signal and sound supplied from the MPU 13 from an audio output section including a speaker, etc.

In the display example of FIG. 1, an icon 21 and a pointer 22 are displayed in the image display section of the output section 16. The input apparatus 31 is operated by a user in order to change the display position of the pointer 22, and to remotely control the television receiver 10.

Configuration of Input Apparatus

Figure 2:
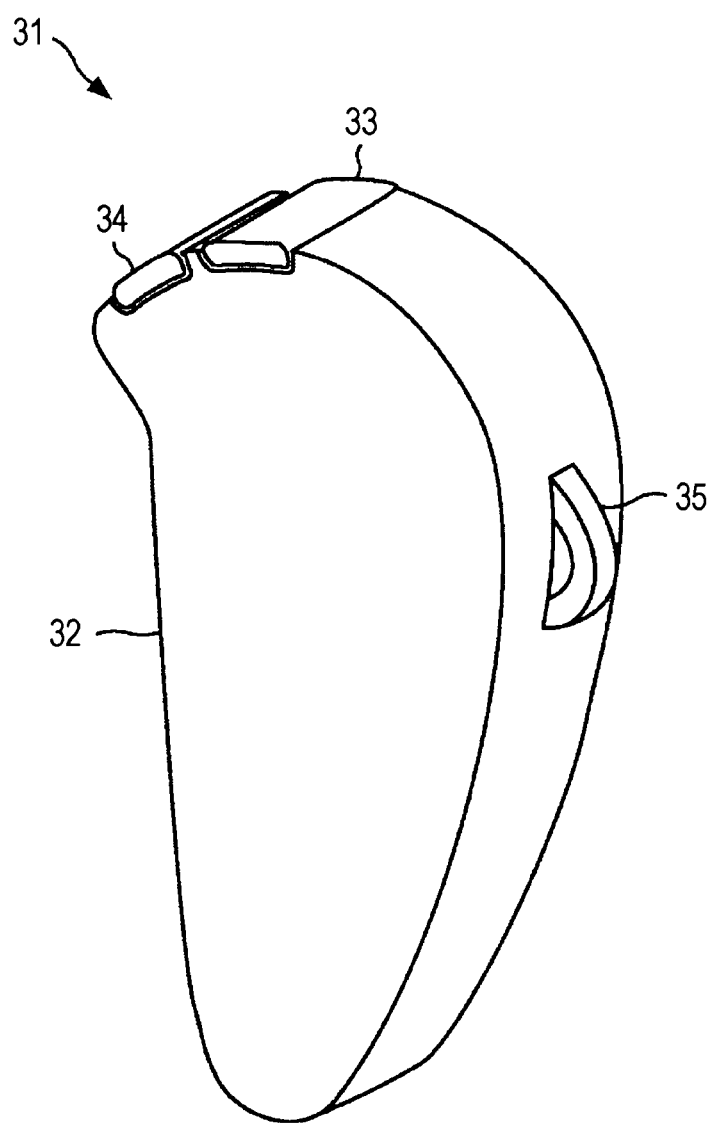
FIG. 2 is a perspective diagram illustrating a configuration of an outer view of an input apparatus.

FIG. 2 illustrates an outer view of a configuration of an input apparatus 31. The input apparatus 31 has a main unit 32 as an operation section operated by the user for generating a corresponding value corresponding to a motion of an image displayed on a screen of the image display section of the electronic apparatus. Buttons 33 and 34 are disposed on the upper surface of the main unit 32, and a jog dial 35 is disposed on the right side surface.

Figure 3:
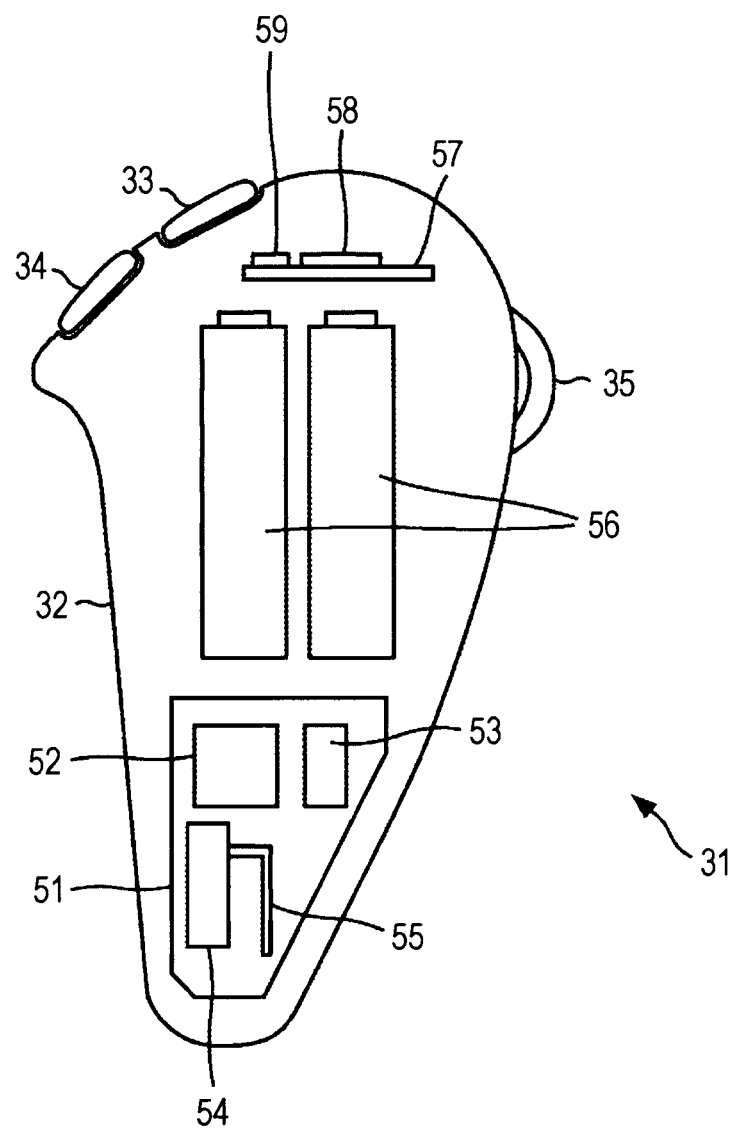
FIG. 3 is a diagram illustrating an internal configuration of the input apparatus.

FIG. 3 illustrates an internal configuration of the main unit 32 of the input apparatus 31. The input apparatus 31 includes a main substrate 51, a sensor substrate 57, and batteries 56 in the inside. A MPU 52, a quartz crystal oscillator 53, a transmission section 54, and an antenna 55 are attached to the main substrate 51.

Figure 4:
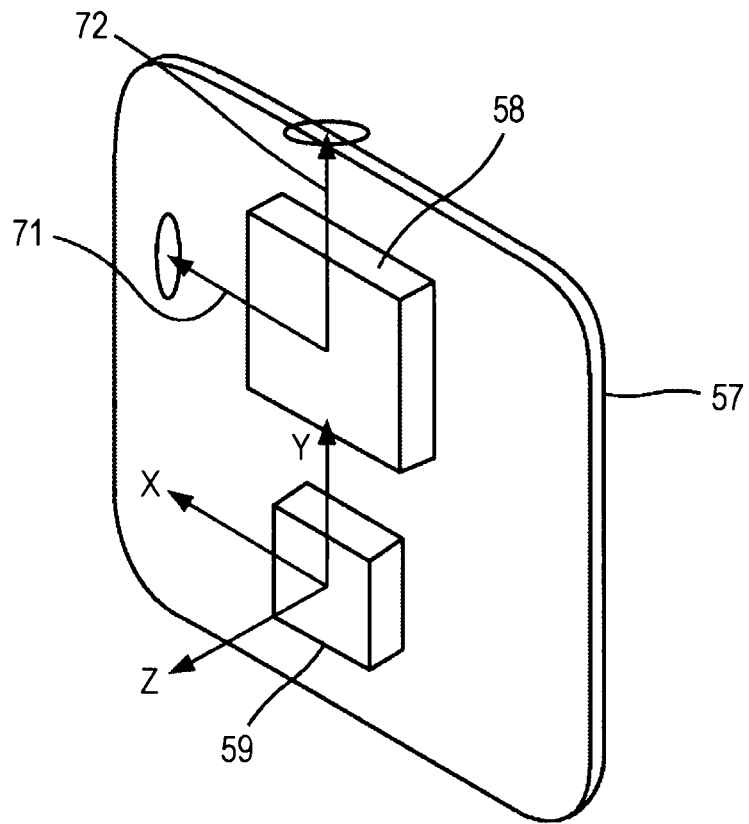
FIG. 4 is a perspective view illustrating a configuration of a sensor substrate.

As shown by an enlarged view in FIG. 4, an angular velocity sensor 58 and an acceleration sensor 59, which are manufactured by MEMS (Micro Electro Mechanical Systems) technology, are attached to the sensor substrate 57. The sensor substrate 57 is disposed in parallel with an X-axis and a Y-axis, which are two sensitivity axes perpendicular to each other, of the angular velocity sensor 58 and the acceleration sensor 59, which are inertia sensors.

Figure 5:
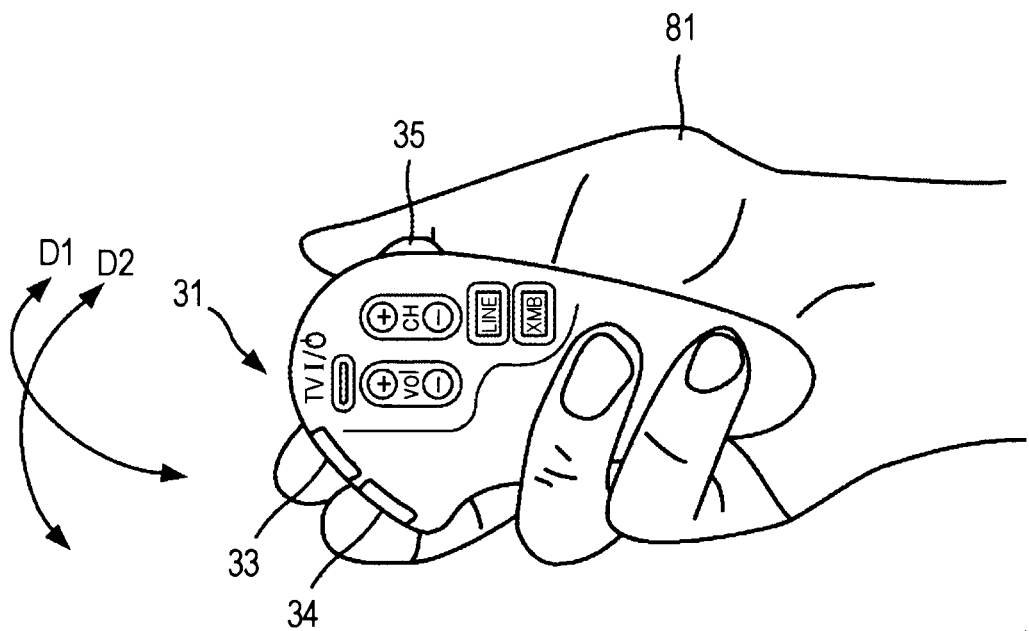
FIG. 5 is a diagram illustrating a use state of the input apparatus.

In a state of facing the top of the main unit 32 (an end in the left direction in FIG. 5) to a television receiver 10 (which is not shown in FIG. 5, but is positioned in the left direction) typically, for example, the user is assumed to operate the entire main unit 32 in any directions D1 and D2 shown in FIG. 5. The angular velocity sensor 58 including a biaxial-vibrating angular velocity sensor, detects an angular velocities of the pitch angle and the yaw angle rotating about a pitch rotation axis 71 and a yaw rotation axis 72, which are in parallel with the X-axis and the Y-axis, respectively. The acceleration sensor 59 detects accelerations in the X-axis and Y-axis. The acceleration sensor 59 can detect a gravitational acceleration as a vector quantity using the sensor substrate 57 as a sensitivity plane. For the acceleration sensor 59, a triaxial acceleration sensor using an X-axis, a Y-axis, and a Z-axis as sensitivity axes can also be used.

The two batteries 56 supply necessary power to individual sections.

FIG. 5 shows a use state of the input apparatus 31. As shown in the figure, the user holds the input apparatus 31 in hand 81, and operates the entire input apparatus 31 in any direction in a three-dimensional free space. The input apparatus 31 detects the operated direction, and outputs an operation signal in the operated direction. Also, if buttons, such as buttons 33 and 34, a jog dial 35, etc., are operated, the input apparatus 31 outputs the operation signal thereof.

The button 33 corresponds to a left button of an ordinary mouse operated on a flat surface, and the button 34 corresponds to a right button. The button 33 is operated by the index finger, the button 34 is operated by the middle finger, and the jog dial 35 is operated by the thumb. A command issued at the time of each button being operated is any command. For example, the commands may be set as follows.

One-time pressing of the button 33: left click: selection
Long pressing of the button 33: drag: move an icon
Two-time pressing of the button 33: double click: opens a file or a folder, or execute a program
One-time pressing of the button 34: right click: show menu
Rotate the jog dial: scroll
Pressing of the jog dial: determination If the settings are determined like this, the user is allowed to use the input apparatus 31 with a same operational sense as that of a mouse operated on a flat surface.

The button 33 may be a two-step switch. In this case, when the first-step switch is operated, or in a state of being pressed, an operation signal of the input apparatus 31, indicating movement, is output, and when the second-step switch is operated, selection is performed. Of course, a special button may be provided, and if that button is operated, an operation signal indicating movement may be output.

Electrical Configuration of Input Apparatus

Figure 6:
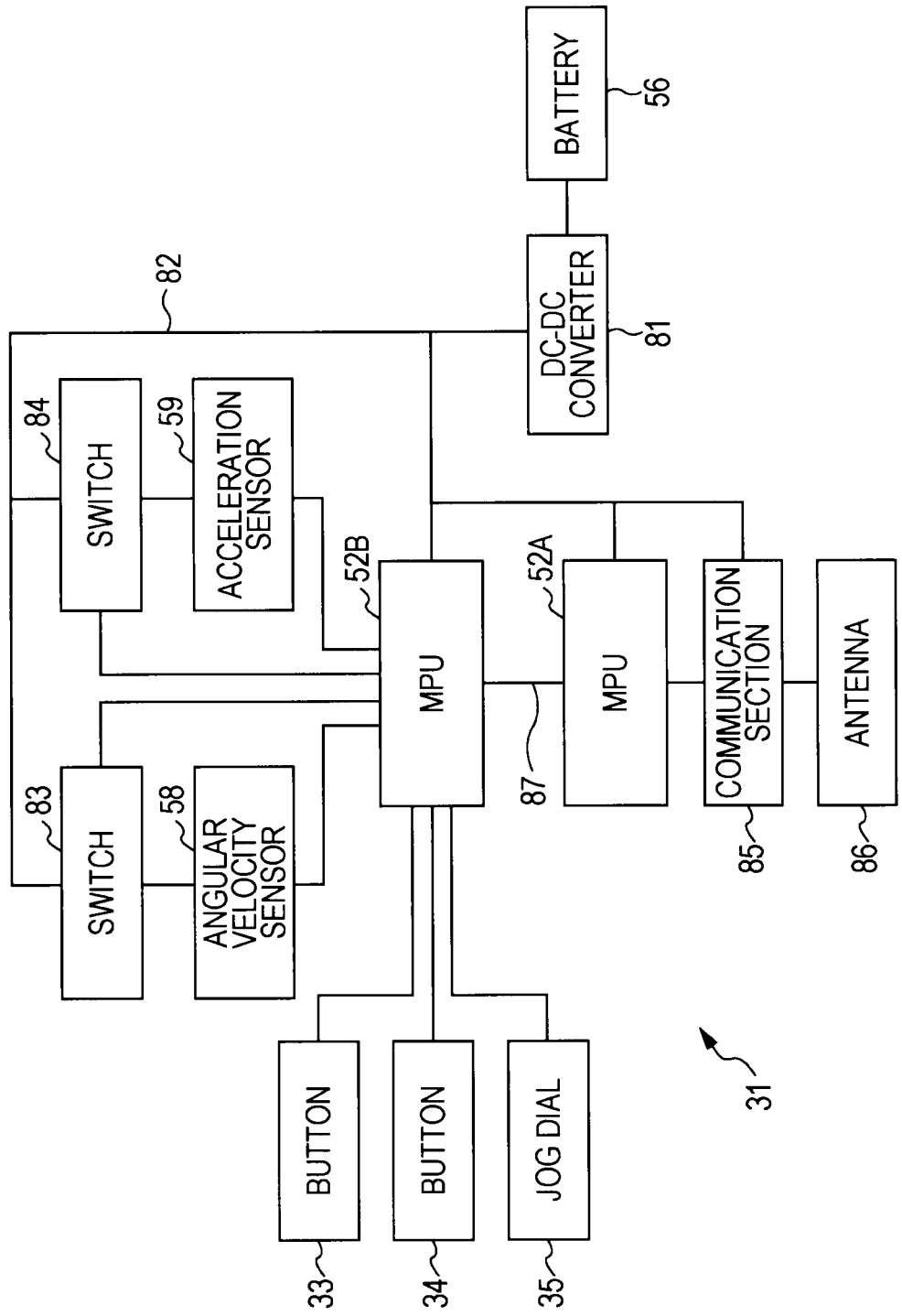
FIG. 6 is a block diagram illustrating an electrical configuration of the input apparatus.

FIG. 6 illustrates an electrical configuration of the input apparatus 31.

A DC/DC converter 81 converts a voltage from the batteries 56 into a predetermined voltage, and outputs the voltage through the power line 82. This power is supplied to the angular velocity sensor 58 and the acceleration sensor 59 through the switches 83 and 84, respectively. Also, the power is supplied to an MPU 52A and an MPU 52B constituting the MPU 52, and a communication section 85.

One of the two independent MPUs constituting the MPU 52, the MPU 52B, processes signals from the buttons 33 and 34, and the jog dial 35, detection signals from the angular velocity sensor 58 and the acceleration sensor 59, information of the switches 83 and 84, etc., and outputs the processed signals to the MPU 52A through the communication line 87.

The other of the two independent MPUs constituting the MPU 52, the MPU 52A, controls the operation of overall input apparatus 31, and controls communication with the television receiver 10. The communication section 85 is controlled by the MPU 52A, and communicates with the television receiver 10 through the antenna 86 by a radio wave. The MPU 52A and the MPU 52B are connected by the communication line 87.

By dividing the MPU 52 into two pieces in this manner, it becomes possible to perform high-speed processing. Also, if another method of radio communication, such as Bluetooth, ZigBee, a 2.4-GHz band independent standard, etc., is employed by a user's request, an MPU for controlling a pointer can be used in common. Thus, it is possible to shorten the development period, and thereby it becomes advantageous in overall cost.

Functional Configuration of MPU of Input Apparatus

Figure 7:
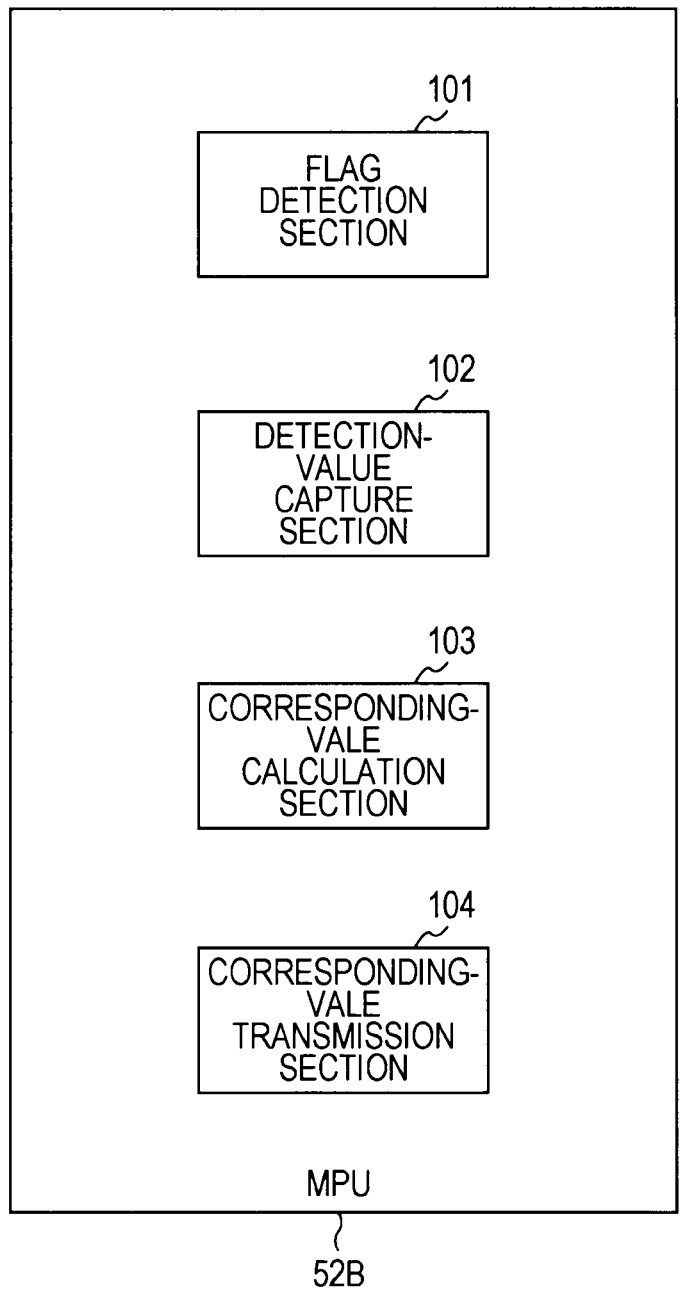
FIG. 7 is a block diagram illustrating a functional configuration of an MPU.
Figure 8:
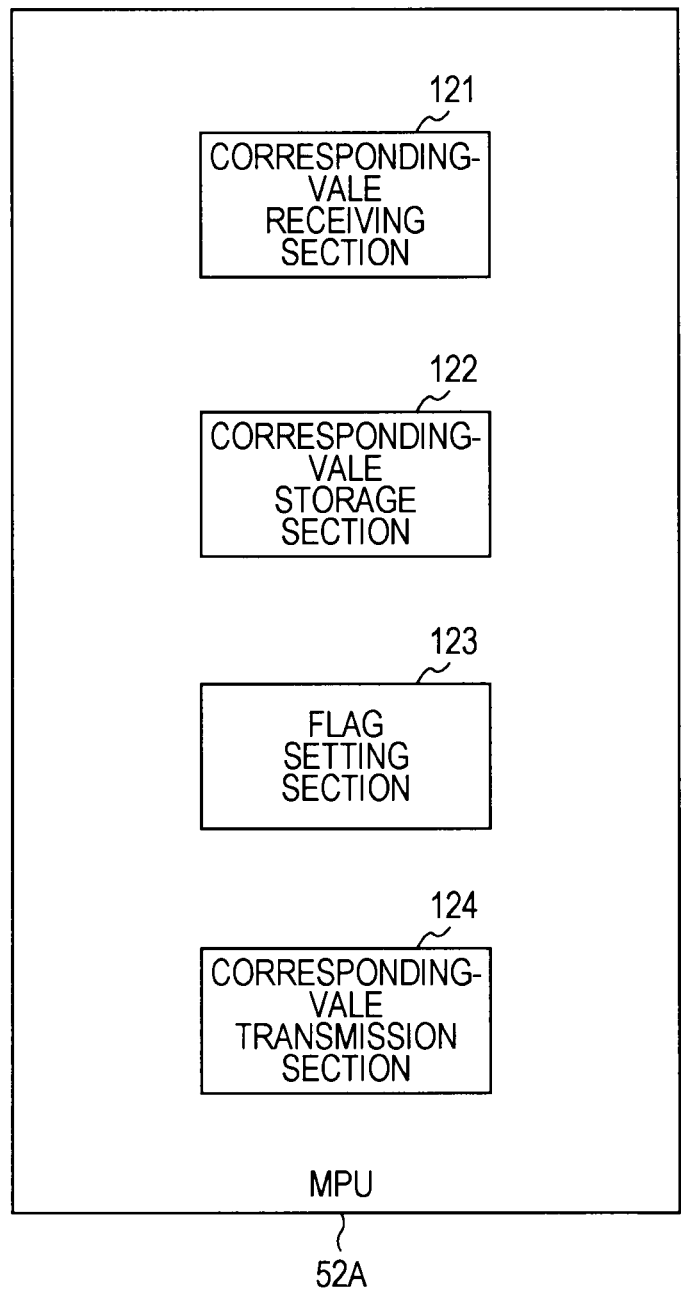
FIG. 8 is a block diagram illustrating a functional configuration of an MPU.

FIG. 7 and FIG. 8 illustrate functional configurations of the MPU 52B and the MPU 52A that operate in accordance with the programs stored in the internal memories, respectively.

As shown in FIG. 7, the MPU 52B has a flag detection section 101, a detection-value capture section 102, a corresponding-value calculation section 103, and a corresponding-value transmission section 104.

The flag detection section 101 detects a flag set by a flag setting section 123 of the MPU 52A, described later with reference to FIG. 8. The detection-value capture section 102 captures detection values from the angular velocity sensor 58 and the acceleration sensor 59. The corresponding-value calculation section 103 calculates corresponding values corresponding to the detection values. The transmission section 104 transmits the corresponding values to the MPU 52A.

As shown in FIG. 8, the MPU 52A has a corresponding-value receiving section 121, a corresponding-value storage section 122, a flag setting section 123, and a corresponding-value transmission section 124.

The corresponding-value receiving section 121 receives the corresponding value transmitted from the MPU 52B through the communication line 87. The corresponding-value storage section 122 stores the corresponding value received by the corresponding-value receiving section 221. The flag setting section 123 manages the flag indicating that the corresponding value is being transmitted to the television receiver 10 by a radio wave. The corresponding-value transmission section 124 manages the transmission of the corresponding value to the television receiver 10 by the radio wave.

Operation of Input Apparatus

Figure 9:
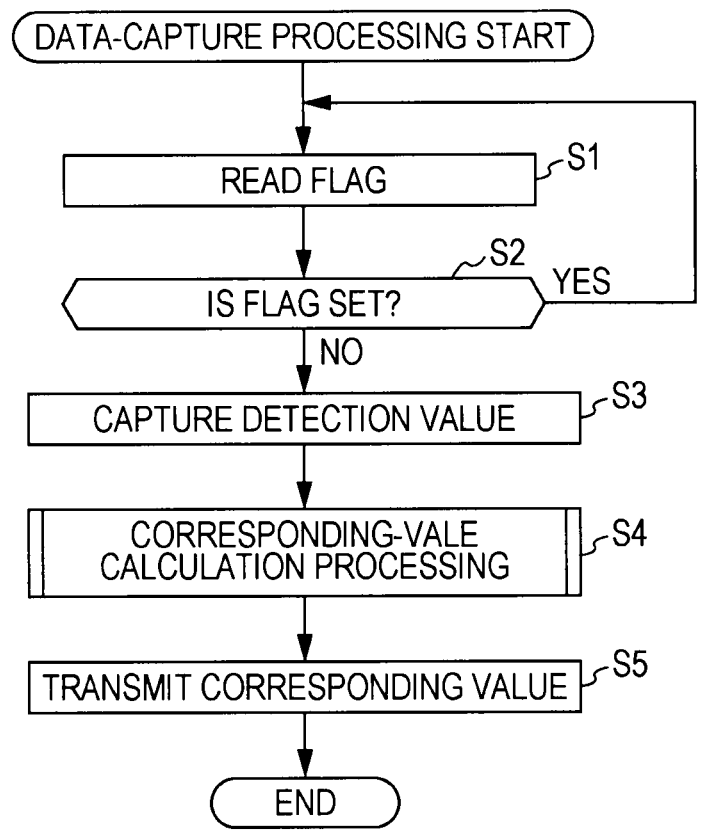
FIG. 9 is a flowchart illustrating data capture processing of the MPU.
Figure 10:
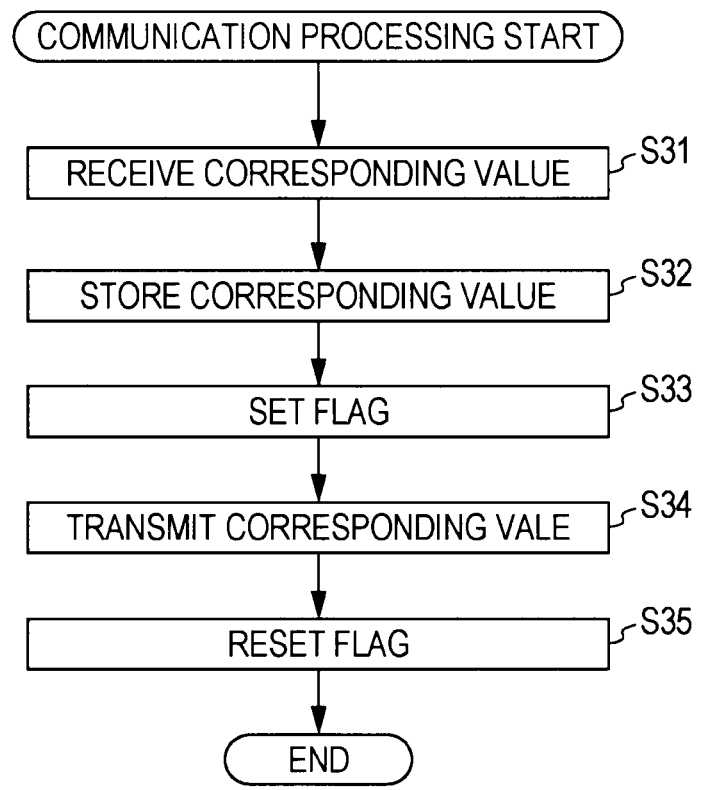
FIG. 10 is a flowchart illustrating communication processing of the MPU.

Next, with reference to FIGS. 9 and 10, a description is given of the processing in the case where the input apparatus 31 is operated, and the operation signal thereof is transmitted to the television receiver 10.

In order to move the pointer 22 shown in the output section 16 of the television receiver 10 in a predetermined direction, if the user hold the main unit 32 in hand, operates a first step of the two-step-switch button 33 or keeps the button 33 pressed, and operates the entire input apparatus 31 in any predetermined direction, that is to say, the entire input apparatus 31 is moved in any direction in the three-dimensional free space, the MPU 52B performs data capture processing shown by the flowchart of FIG. 9.

That is to say, in step S1, the flag detection section 101 of the MPU 52B detects a flag. As described later with reference to FIG. 10, the MPU 52A sets the flag while the communication section 85 is transmitting the operation signal to the television receiver 10 by radio communication through the antenna 86. This flag is detected.

In step S2, the detection-value capture section 102 determines whether the flag is set. If determined that the flag detected in step S1 is set, the processing returns to step S1, and the subsequent processing is repeated. That is to say, in this case, the MPU 52A is transmitting the operation signal to the television receiver 10 by the radio wave, and thus the processing from step S3 to step S5, described later, is not performed. That is to say, the capturing the detection values from the sensors is prohibited.

If determined that the flag detected in step S1 is not set, the MPU 52A is not transmitting the operation signal to the television receiver 10 by the radio wave. Thus, in step S3, the detection-value capture section 102 captures the detection values detected by the angular velocity sensor 58 and the acceleration sensor 59 as detection sections. That is to say, the detection values for generating the corresponding value corresponding to the motion of the pointer 22 on a screen of the image display section are captured. Specifically, the detection value of the angular velocity sensor 58 and the detection value of the acceleration sensor 59 are individually A/D converted by A/D conversion sections built in the MPU 52B and captured.

In step S4, the corresponding-value calculation section 103 calculates the corresponding value. The details thereof will be described later with reference to FIG. 12. Thereby, the corresponding values corresponding to the detection values captured in step S3 are calculated.

In step S5, the corresponding-value transmission section 104 transmits the corresponding values. That is to say, the corresponding values calculated in step S4 are transmitted to the MPU 52A through the communication line 87.

A Coriolis force caused by a change in angle is weak, and thus the angular velocity sensor 58 contains an amplifier IC for amplifying the detection signal of Coriolis force by hundreds of times to thousands of times. As a result of a test, many of the angular velocity sensors were easily subjected to the influence of radio noise. As a result, when the radio wave transmitted toward the television receiver 10 was received by the angular velocity sensor 58, the output level of the angular velocity sensor 58 sometimes has reached to a limit. In such a state in which the radio wave of the operation signal is received, it becomes difficult to correctly detect a Coriolis force, namely an angular velocity.

Thus, in the case of this embodiment, as described above, the capturing of the detection value of the angular velocity sensor 58 is prohibited during the time period of generating a radio wave. The capturing of the detection value of the angular velocity sensor 58 is performed only in the time period in which the radio wave is not generated. Accordingly, it becomes possible to correctly detect the angular velocity without being influenced by noise caused by the radio wave.

If the acceleration sensor 59 is not influenced by the radio waves so much, the detection value of the acceleration sensor 59 may be captured while the radio wave is being transmitted. However, in the present embodiment, in order to match the detection timing with that of the angular velocity sensor 58, the capturing of the detection value of the acceleration sensor 59 is prohibited during the period of transmitting the radio wave.

Corresponding to such processing of the MPU 52B, the MPU 52A performs processing as shown by the flowchart in FIG. 10.

In step S31, the corresponding-value receiving section 121 of the MPU 52A receives the corresponding value transmitted from the MPU 52B through the communication line 87. In step S32, the corresponding value storage 122 stores the corresponding value received in step S31. In step S33, the flag setting section 123 sets the flag. After the flag is set, the corresponding-value transmission section 124 transmits the corresponding value in step S34. That is to say, the communication section 85 modulates the corresponding value stored in the corresponding-value storage section 122 once, and transmits the corresponding value toward the television receiver 10 through the antenna 86 by the radio wave.

In the television receiver 10, this radio wave is received by the receiving section 12 through the antenna 11, is demodulated, and is supplied to the MPU 13. The MPU 13 draws predetermined image data in the video RAM 15 on the basis of the received corresponding value, and moves and displays the pointer 22 to the position corresponding to the operation of the input apparatus 31 in the output section 16.

In the case of this embodiment, as described above, the operation speed (Vx, Vy) of the input apparatus 31 is used as the corresponding values. In the television receiver 10, the coordinate values of the pointer 22 are generated by the following expressions.

$$X(t)=X(t-1)+Vx$$

$$Y(t)=Y(t-1)+Vy \quad (1)$$

That is to say, new coordinate values are calculated by adding the speed (Vx, Vy), as the corresponding values corresponding to the motion of the pointer 22 which is an image displayed on the screen of the image display section, to the previous coordinates (X(t−1), Y(t−1)). The control is performed so that the pointer 22 is displayed at the generated coordinates.

When the transmission of the corresponding value has been completed, in step S35, the flag setting section 123 resets the flag set in step S33. In this manner, the flag is set while the radio wave is being transmitted, and is reset while the radio wave is not being transmitted.

By repeating the above processing, the corresponding value is intermittently transmitted to the television receiver 10 by the radio wave. Here, it is possible to use packet communication on the basis of a standard, such as Bluetooth (registered trademark), ZigBee (registered trademark), etc., for example.

In this manner, in this embodiment, the MPU 52B detects a time period while the MPU 52A is transmitting the corresponding value by the radio wave on the basis of the flag, and manages the capture timing of the detection value so as not to capture the detection value during that period. Accordingly, the detection value is not captured while the corresponding to value is being transmitted by the radio wave, and thus allowing the sensor to prevent from mistakenly detecting radio noise as an operation of the input apparatus 31. The advantage becomes especially remarkable when the input apparatus 31 is miniaturized, and the distance between the sensor and the antenna becomes small.

In this regard, in the above, the flag is set while the corresponding value is being transmitted by the radio wave. However, the flag may further be set while various kinds of buttons of the input apparatus 31 are operated. In that case, it becomes possible to more reliably prevent erroneous detection of radio noise as an operation of the input apparatus 31.

As described above, in the case of the embodiment in FIG. 9 and FIG. 10, the MPU 52A and the MPU 52B can operate asynchronously. Accordingly, the degree of freedom in design becomes high.

Corresponding-Value Calculation Processing

Figure 11:
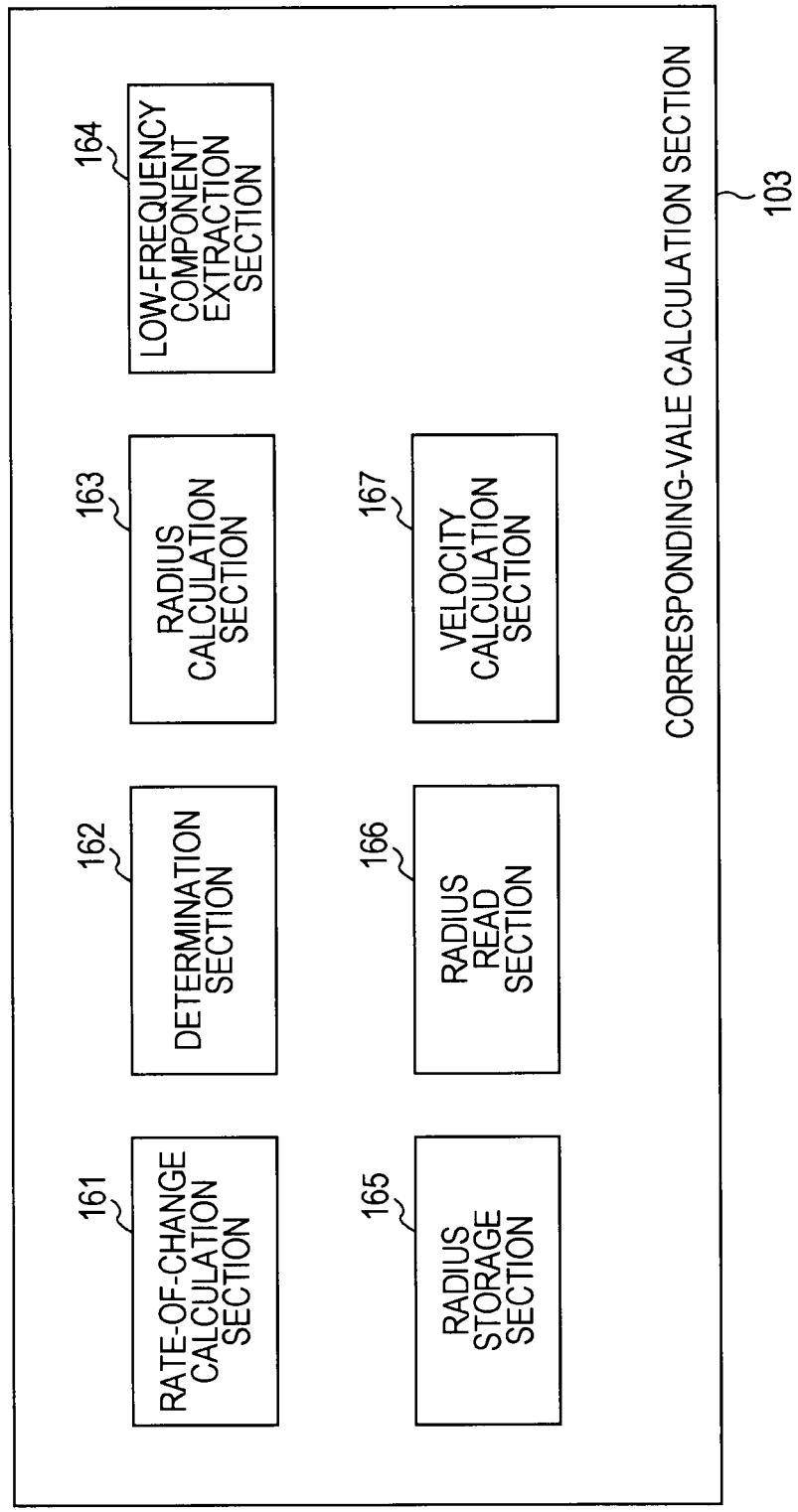
FIG. 11 is a block diagram illustrating a functional configuration of a corresponding-value calculation section.

Next, a detailed description is given of corresponding-value calculation processing performed in step S4 in FIG. 9. In order to perform this processing, the corresponding-value calculation section 103 has a functional configuration as shown in FIG. 11.

The corresponding-value calculation section 103 has a rate-of-change calculation section 161, a determination section 162, a radius calculation section 163, a low-frequency component extraction section 164, a radius storage section 165, a radius read section 166, and a velocity calculation section 167.

The rate-of-change calculation section 161 calculates a rate-of-change in acceleration and a rate-of-change in angular acceleration. The determination section 162 performs various kinds of determination processing. The radius calculation section 163 calculates a radius of gyration when the input apparatus 31 is operated. The low-frequency component extraction section 164 extracts low-frequency components of data. The radius storage section 165 stores the calculated radius of gyration. The radius read section 166 reads the stored radius of gyration. The velocity calculation section 167 calculates the velocity.

Figure 12:
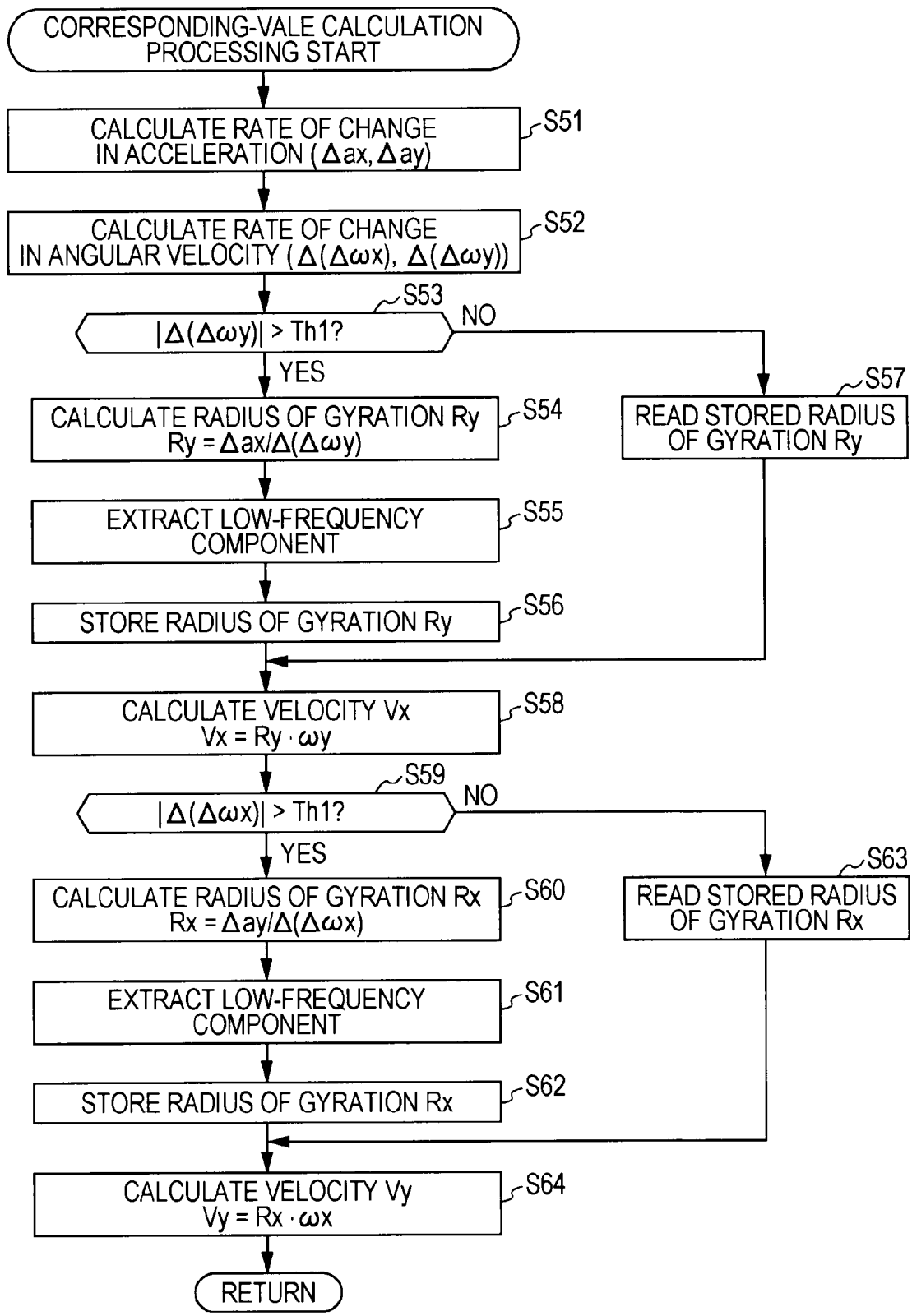
FIG. 12 is a flowchart illustrating corresponding-value calculation processing.

Next, a detailed description is given of the corresponding-value calculation processing with reference to FIG. 12.

First, a description is given of the principle of the velocity calculation.

The velocity of the input apparatus 31 is obtained by multiplying the angular velocity by the radius of gyration. That is to say, when the user operates the input apparatus 31, the motion of the input apparatus 31 becomes the combination of the rotational motion about a user's shoulder, elbow, wrist, etc. And the radius of gyration becomes the distance from a center of rotation changing each time of the combined rotational motion to the input apparatus 31.

Assuming that the velocity of the input apparatus 31 is (Vx, Vy), and the angular velocity is (ωx, ωy), the radius of gyration (Rx, Ry) is expressed by the following expression.

$$(Rx, Ry)=(Vx, Vy)/(\omega x, \omega y) \quad (2)$$

The right-hand side of the expression (2) has a dimension of velocity.

If the velocity and the angular velocity expressed on the right-hand side of the expression (2) are differentiated individually, and the dimensions become acceleration or the rate of change in the acceleration in time, the correlation will not be lost. In the same manner, if the velocity and the angular velocity are integrated individually, and the dimension becomes displacement, the correlation will not be lost.

Accordingly, the velocity and the angular velocity expressed on the right-hand side of the expression (2) are changed to have dimensions of displacement, acceleration, and the rate of change in the acceleration in time, the following expressions (3) to (5) are obtained.

$$(Rx, Ry)=(x, y)/(\varphi, \theta) \quad (3)$$

$$(Rx, Ry)=(ax, ay)/(\Delta \omega x, \Delta \omega y) \quad (4)$$

$$(Rx, Ry)=(\Delta ax, \Delta ay)/(\Delta(\Delta \omega x), \Delta(\Delta \omega y)) \quad (5)$$

In the above-described expressions, for example, if attention is given to the expression (5), it is understood that if the rate of change ($\Delta ax$, $\Delta ay$) in the acceleration (ax, ay) and the rate of change ($\Delta(\Delta\omega x)$, $\Delta(\Delta\omega y)$) in the angular acceleration ($\Delta\omega x$, $\Delta\omega y$) are given, the radius of gyration (Rx, Ry) can be obtained. In this embodiment, the radius (Rx, Ry) is obtained on the basis of the expression (5).

In step S51 in FIG. 12, the rate-of-change calculation section 161 having a function of a differential filter differentiates the acceleration (ax, ay) as the detection value captured from the acceleration sensor 59 in step S3 in FIG. 9 to calculate the rate of change ($\Delta ax$, $\Delta ay$) in the acceleration. Also, in step S52, the rate-of-change calculation section 161 performs second-order differentiation on the angular velocity ($\omega x$, $\omega y$) as the detection value captured from the angular velocity sensor 58 in step S3 in FIG. 9 to calculate the rate of change ($\Delta(\Delta\omega x)$, $\Delta(\Delta\omega y)$) in the angular acceleration ($\Delta\omega x$, $\Delta\omega y$).

The reason for calculating the rate of change ($\Delta ax$, $\Delta ay$) in the acceleration (ax, ay) in step S51 is to obtain the radius of gyration in step S54 described later, and to alleviate the influence of the gravitational acceleration on the acceleration sensor 59.

That is to say, the acceleration detected by the acceleration sensor 59 is the combined acceleration of the acceleration of the inertia force caused by the user's operation on the input apparatus 31 and the acceleration caused by gravity. However, the rate of change in the acceleration caused by gravity is about $\frac{1}{10}$ times the rate of change in the acceleration caused by the inertia force in size. Also, the acceleration caused by gravity has different frequency components from those of the acceleration caused by the inertia force.

The frequency of the acceleration caused by gravity is lower than the frequency of the acceleration caused by the inertia force. A differential operation has a high-pass filter characteristic, and thus the cutoff frequency is set to a value between the acceleration frequency by gravity and the acceleration frequency by the inertia force so that the acceleration caused by inertia can be passed, and the acceleration caused by gravity can be attenuated. Accordingly, the rate of change ($\Delta ax$, $\Delta ay$) in the acceleration (ax, ay) obtained by the processing in step S51 substantially becomes the rate of change in the acceleration by the inertia force, because the rate-of-change component in the acceleration by gravity is attenuated.

As a result, when the radius of gyration Ry is calculated in step S54 described later, it becomes difficult to reflect the acceleration of the gradient component caused by a change in posture of the input apparatus 31. Accordingly, it becomes difficult for the velocity calculated on the basis of the radius of gyration Ry to be influenced by the acceleration of the gradient component caused by a change in posture of the input apparatus 31. Thereby, the influence of gravity by a change in posture of the input apparatus 31 is reduced.

In this regard, the cutoff frequency is suitably set in consideration of the frequency of the acceleration by gravity of the input apparatus 31 and the frequency of the acceleration of the inertia force of the input apparatus 31. Also, the cutoff frequency may be set in consideration of low-frequency components by a temperature drift of the acceleration sensor 59 and a DC offset value. That is to say, low-frequency components including a gravitational acceleration component sometimes includes, for example, a low-frequency component by the temperature drift and a DC offset component in addition to the gravity acceleration component.

Next, processing for obtaining a velocity Vx in an X-axis direction is performed. That is to say, in step S53, the determination section 162 determines whether the absolute value $|\Delta(\Delta\omega y)|$ of the rate of change in the angular acceleration about the Y-axis, calculated in step S52, is greater than a threshold value Th1.

The reason for determining the threshold value in this manner is that the rate of change in angular acceleration ($\Delta(\Delta\omega x)$, $\Delta(\Delta\omega y)$) is calculated by the second-order differentiation performed on the angular velocity ($\omega x$, $\omega y$). That is to say, if noise arises on the angular velocity ($\omega x$, $\omega y$), high-frequency noise is expanded by the second-order differentiation, and the rate of change in angular acceleration is calculated in a state of high-frequency noise being expanded. As a result, the radius of gyration (Rx, Ry), which is calculated on the basis of the rate of change in angular acceleration, and the velocity (Vx, Vy), calculated on the basis of the radius of gyration, are influenced by noise, thereby making it difficult to correctly calculate the radius of gyration and the velocity. In particular, the smaller the absolute value ($|\Delta(\Delta\omega x)|$, $|\Delta(\Delta\omega y)|$) of the rate of change in angular acceleration, the influence of noise on the radius of gyration and the velocity relatively increase.

Thus, if the absolute value $|\Delta(\Delta\omega y)|$ of the rate of change in angular acceleration is greater than the threshold value Th1, that is to say, if the influence of noise is small, in step S54, the radius calculation section 163 calculates the radius of gyration Ry using the rate of change in angular acceleration $\Delta(\Delta\omega y)$ calculated in step S52 by the following expression.

$$Ry = \Delta ax / \Delta(\Delta\omega y) \quad (6)$$

In step S55, the low-frequency component extraction section 164 extracts a low-frequency component of the radius-of-gyration signal Ry. Thereby, it is possible to further alleviate the influence of high-frequency noise. The processing for a low-pass filter extracting the low-frequency component gives a delay in signal. However, the radius of gyration dose not change suddenly, and thus the influence is relatively small.

The cutoff frequency of the low-pass filter might include high-frequency noise by the calculation performed in step S52 as described above. Thus, the cutoff frequency is suitably set such that the noise is attenuated or removed. Also, the low-pass filter is designed so as to have a minimum delay in response when the radius-of-gyration signal passes through.

In step S56, the radius storage section 165 stores the radius of gyration Ry, which has been calculated in step S54 and whose low-frequency components have been extracted in step S55.

On the other hand, in step S53, if determined that the absolute value $|\Delta(\Delta\omega y)|$ of the rate of change in angular acceleration is not greater than the threshold value Th1, that is to say, if the influence of noise is large, the processing from step S54 to step S56 is not performed. Instead, in step S57, the radius read section 166 reads the radius of gyration Ry stored at previous time in step S56.

After the processing in step S56 or in step S57, in step S58, the velocity calculation section 167 calculates the velocity Vx as an operation signal by the following expression.

$$Vx = Ry \cdot \omega y \quad (7)$$

If the absolute value $|\Delta(\Delta\omega y)|$ of the rate of change in angular acceleration is greater than the threshold value Th1, that is to say, if the influence of noise is small, the velocity calculation uses the radius of gyration Ry, which has been calculated in step S53 using the absolute value $|\Delta(\Delta\omega y)|$ of the rate of change in angular acceleration, which is higher than the threshold value Th1. However, if the absolute value $|\Delta(\Delta\omega y)|$ of the rate of change in angular acceleration is not greater than the threshold value Th1, that is to say, if the influence of noise is large, the velocity calculation in the above-described expression uses the radius of gyration Ry stored in the previous time.

The same processing is performed when the velocity Vy in the Y-axis direction is obtained.

That is to say, in step S59, the determination section 162 determines whether the absolute value $|\Delta(\Delta\omega x)|$ of the rate of change in angular acceleration about the X-axis, calculated in step S52, is greater than a threshold value Th1.

If the absolute value $|\Delta(\Delta\omega x)|$ of the rate of change in angular acceleration is greater than the threshold value Th1, that is to say, if the influence of noise is small, in step S60, the radius calculation section 163 calculates the radius of gyration Rx using the rate of change in angular acceleration $\Delta(\Delta\omega x)$ calculated in step S52 by the following expression.

$$Rx = \Delta ay/\Delta(\Delta\omega x) \qquad (8)$$

In step S61, the low-frequency component extraction section 164 extracts a low-frequency component of the radius-of-gyration signal Rx. Thereby, it is possible to further alleviate the influence of high-frequency noise.

The cutoff frequency of the low-pass filter might include high-frequency noise by the calculation performed in step S52 as described above. Thus, the cutoff frequency is suitably set such that the noise is attenuated or removed. Also, the low-pass filter is designed so as to have a minimum delay in response when the radius-of-gyration signal passes through.

In step S62, the radius storage section 165 stores the radius of gyration Rx, which has been calculated in step S60 and whose low-frequency components have been extracted in step S61.

In step S59, if determined that the absolute value $|\Delta(\Delta\omega x)|$ of the rate of change in angular acceleration is not greater than the threshold value Th1, that is to say, if the influence of noise is large, the processing from step S60 to step S62 is not performed. Instead, in step S63, the radius read section 166 reads the radius of gyration Rx stored at previous time in step S62.

After the processing in step S62 or in step S63, in step S64, the velocity calculation section 167 calculates the velocity Vy as an operation signal by the following expression.

$$Vy = Rx \cdot \omega x \qquad (9)$$

If the absolute value $|\Delta(\Delta\omega x)|$ of the rate of change in angular acceleration is greater than the threshold value Th1, that is to say, if the influence of noise is small, the velocity calculation uses the radius of gyration Rx, which has been calculated in step S59 using the absolute value $|\Delta(\Delta\omega x)|$ of the rate of change in angular acceleration, which is higher than the threshold value Th1. However, if the absolute value $|\Delta(\Delta\omega x)|$ of the rate of change in angular acceleration is not greater than the threshold value Th1, that is to say, if the influence of noise is large, the velocity calculation in the above-described expression uses the radius of gyration Rx stored in the previous time.

The velocity (Vx, Vy) obtained as above is transmitted to the MPU 52A as the corresponding value as described above.

In this regard, in the present embodiment, the same value Th1 is used for the threshold values in the yaw direction and in the pitch direction. However, different threshold values may be used in both of the directions. Also, the processing from step S53 to step S58 and the processing from step S59 to step S64 can be executed in parallel.

2. Second Embodiment

Functional Configuration of MPU of Input Apparatus

The MPU 52B and the MPU 52A may be operated in synchronism. In this case, the MPU 52B and the MPU 52A have the functional configurations shown in FIG. 13 and FIG. 14, respectively.

Figure 13:
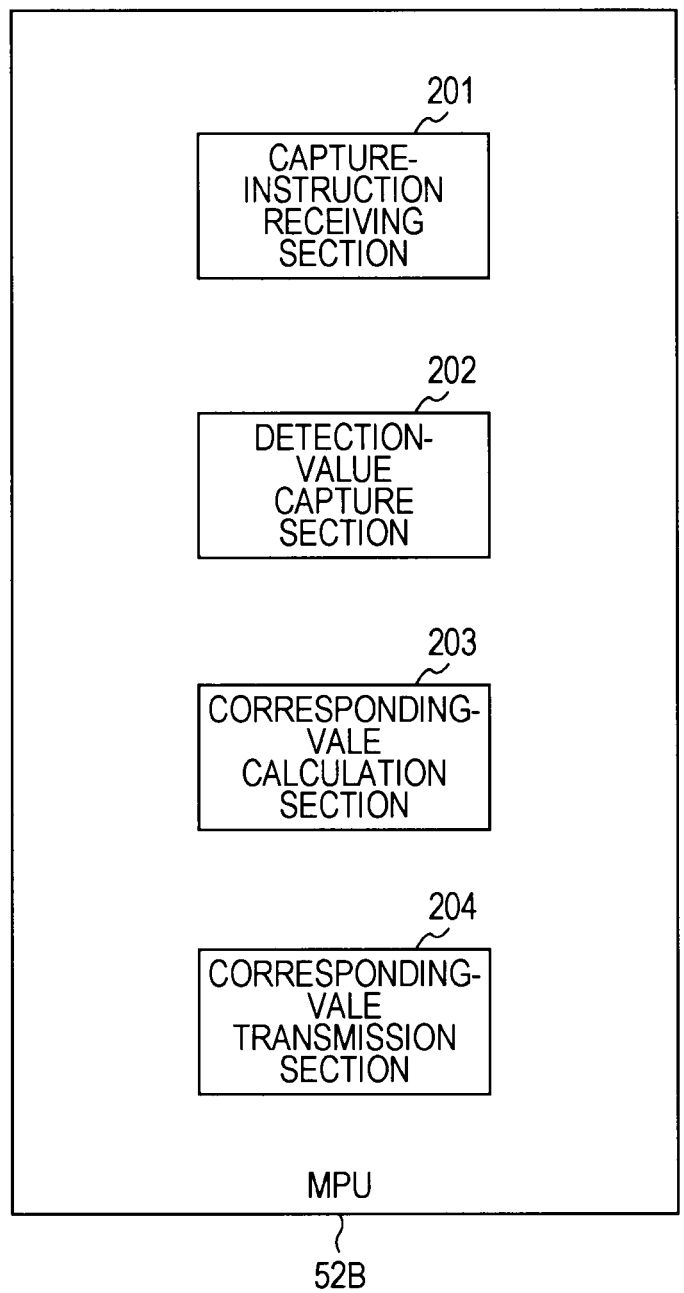
FIG. 13 is a block diagram illustrating a functional configuration of an MPU.

As shown in FIG. 13, the MPU 52B has a capture-instruction receiving section 201, a detection-value capture section 202, a corresponding-value calculation section 203, and a corresponding-value transmission section 204.

The capture-instruction receiving section 201 receives a capture instruction from the MPU 52A. The detection-value capture section 202 captures detection values from the angular velocity sensor 58 and the acceleration sensor 59. The corresponding-value calculation section 203 calculates corresponding values corresponding to the detection values. The transmission section 204 transmits the corresponding values to the MPU 52A.

Figure 14:
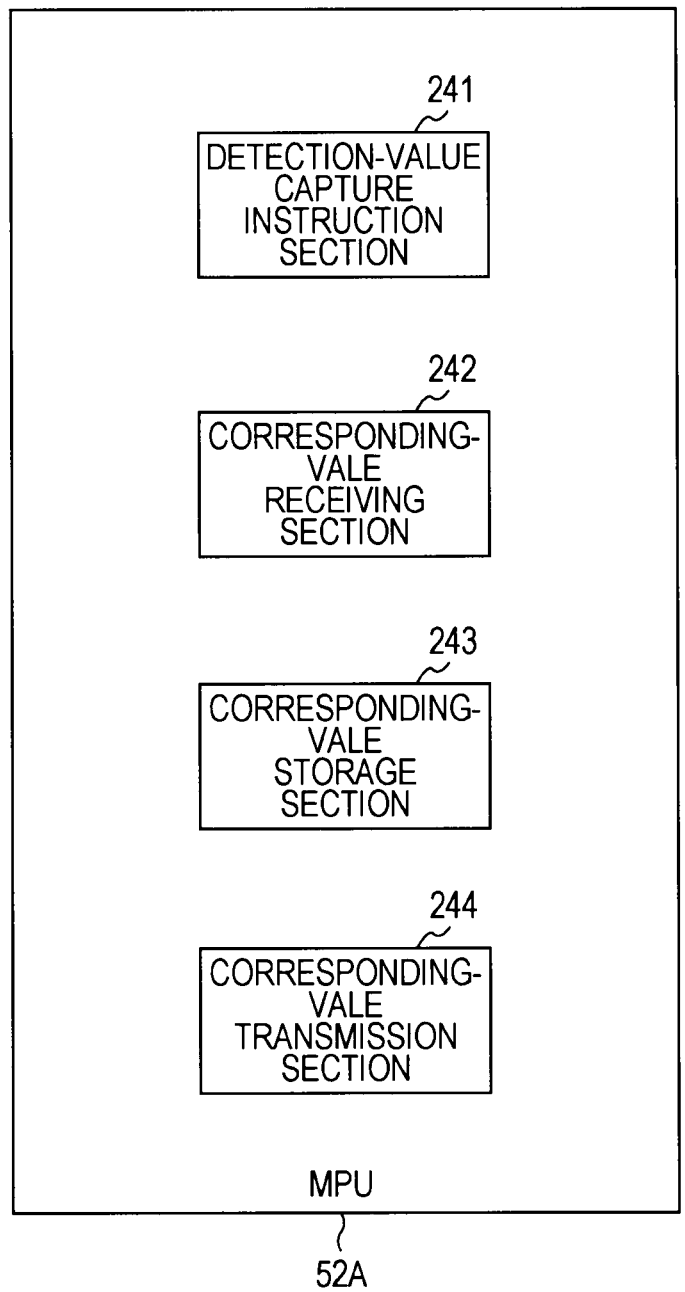
FIG. 14 is a block diagram illustrating a functional configuration of an MPU.

As shown in FIG. 14, the MPU 52A has a corresponding value capture instruction section 241, a corresponding-value receiving section 242, a corresponding-value storage section 243, and a corresponding-value transmission section 244.

The detection-value capture instruction section 241 instructs the MPU 52B to capture the detection value. The corresponding-value receiving section 242 receives the corresponding value from the MPU 52B. The corresponding-value storage section 243 stores the corresponding value. The corresponding-value transmission section 244 transmits the corresponding value to the television receiver 10.

Operation of Input Apparatus

Figure 15:
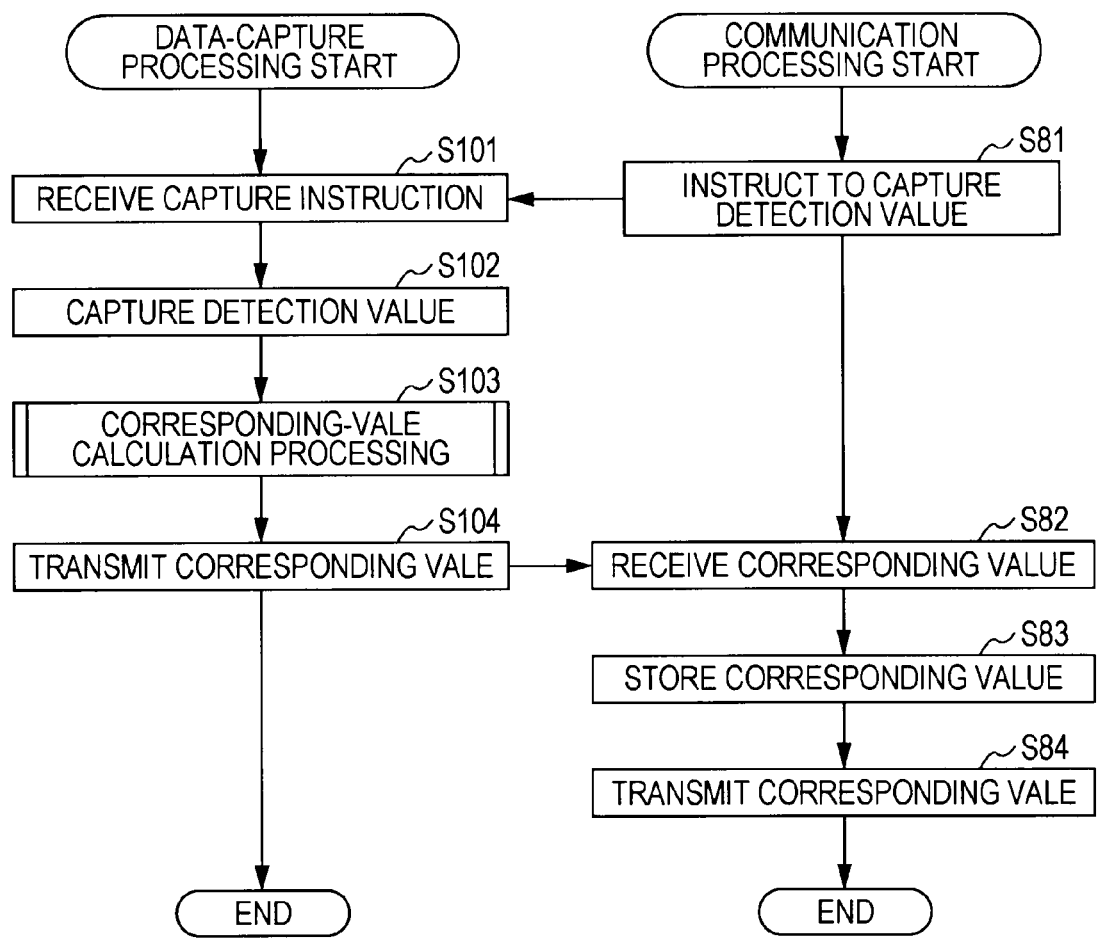
FIG. 15 is a flowchart illustrating communication processing and data capture processing of the MPU.

Next, with reference to a flowchart in FIG. 15, a description is given of processing in which when the input apparatus 31 is operated, the corresponding value based on the operation is transmitted to the television receiver 10. In FIG. 15, the processing from step S81 to step S84 is performed by the MPU 52A, and the processing from step S101 to step S104 is performed by the MPU 52B.

In order to move the unit 22 displayed in the output section 16 of the television receiver 10 in a predetermined direction, when the user holds the main unit 32 in hand and operates the button 33 to the second step, or operates the entire input apparatus 31 in a predetermined direction in a state of the button being pressed, that is to say, when the entire input apparatus 31 is moved in any direction in a three-dimensional free space, the MPU 52A performs communication processing shown by the flowchart in FIG. 15.

In step S81, the detection-value capture instruction section 241 of the MPU 52A instructs to capture the detection value. This instruction is transmitted to the MPU 52B through the communication line 87.

In step S101, the capture-instruction receiving section 201 of the MPU 52B receives the capture instruction from the MPU 52A. In step S102, the detection-value capture section 202 captures the detection value. That is to say, the detection values of the angular velocity sensor 58 and the acceleration sensor 59 are captured. In step S103, the corresponding-value calculation section 203 performs the corresponding-value calculation processing, and calculates the corresponding value corresponding to the detection value. The details of the processing have been described with reference to FIG. 12.

In step S104, the corresponding-value transmission section 204 transmits the corresponding value. That is to say, the corresponding value calculated in step S103 is transmitted to the MPU 52A through the communication line 87.

In step S82, the corresponding-value receiving section 242 of the MPU 52A receives the corresponding value. That is to say, the corresponding value transmitted from the MPU 52B is received. In step S83, the corresponding-value storage section 243 stores the received corresponding value. In step S84, the corresponding-value transmission section 244 of the MPU 52A transmits the corresponding value. That is to say, the corresponding value received in step S82 and stored once in step S83 is modulated by the communication section 85, and is transmitted to the television receiver 10 through the antenna 86 by the radio wave.

In the television receiver 10, this radio wave is received by the receiving section 12 through the antenna 11, is demodulated, and is supplied to the MPU 13. The MPU 13 draws predetermined image data in the video RAM 15 in response to the received corresponding value, and moves and displays the pointer 22 to the position corresponding to the operation of the input apparatus 31 in the output section 16.

In the same manner as the case described with reference to FIG. 10, in the television receiver 10, new coordinates of the pointer 22 are calculated on the basis of the velocity as the corresponding value by the expression (1). And, the pointer 22 is moved to and displayed at the new position.

In this manner, in this embodiment, during a period in which the MPU 52A is transmitting the corresponding value by the radio wave, the MPU 52B manages the capture timing of the detection value so as not to capture the detection value during that period. Accordingly, the detection value is not captured while the radio wave is being transmitted, and thus allowing the sensor to prevent from mistakenly detecting radio noise as an operation of the input apparatus 31. In this case, the advantage also becomes especially remarkable when the input apparatus 31 is miniaturized, and the distance between the sensor and the antenna becomes small.

Variations

In the above, an electronic apparatus operated by the input apparatus 31 is assumed to be a television receiver 10. However, the present invention can be applied to the case of controlling a personal computer, a cellular phone, PDA (Personal Digital Assistants), and the other electronic apparatuses. The input apparatus 31 can be attached to and detached from the electronic apparatuses. If attached, the input apparatus 31 can be used integrally with the electronic apparatus.

Also, the present invention is not limited to a three-dimensional-space mouse, but is effective in being applied to an input apparatus transmitting information for moving a pointer on a screen by a radio wave using a device which is easily influenced by the radio waves, such as a capacitive touchpad.

It is possible for the acceleration sensor 59 to detect the gradient of the input apparatus 31, and to calculate the corresponding value from the gradient. Also, it is possible to use a geomagnetic sensor as a sensor instead of an inertia sensor.

The above-described series of processing can be executed by hardware or by software. When the series of processing is executed by software, programs constituting the software may be installed in a computer built in a dedicated hardware. Alternatively, the programs may be installed from a program recording medium, for example in a general-purpose personal computer, etc., capable of executing various functions by installing various programs.

In this regard, in this specification, the steps describing the programs may, of course, include programs that are processed in time series in accordance with the described sequence. Alternatively, the programs may include processing to be executed in parallel or individually, and not necessarily to be executed in time series.

Also, in this specification, a system represents the entire apparatus including a plurality of apparatuses.

The present application contains subject matter related to that disclosed in Japanese Priority Patent Application JP 2009-000786 filed in the Japan Patent Office on Jan. 6, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An input apparatus comprising:
    an operation section operated by a user for generating a corresponding value corresponding to a motion of an image displayed on a screen of an image display section of an electronic apparatus;
    a detection section detecting a detection value for generating the corresponding value corresponding to the motion of the image by an operation of the operation section;
    a calculation section calculating the corresponding value from the detection value detected by the detection section;
    a transmission section transmitting the corresponding value calculated by the calculation section to the electronic apparatus by a radio wave; and
    a capture section capturing the detection value detected by the detection section from the detection section in a time period when the corresponding value is not transmitted to the electronic apparatus by the radio wave.

2. The input apparatus according to claim 1, wherein the detection section is an inertia sensor.

3. The input apparatus according to claim 2, wherein the inertia sensor is an angular velocity sensor.

4. The input apparatus according to claim 2, further comprising a setting section setting a flag indicating that the radio wave is being transmitted,
    wherein the capture section captures the detection value from the detection section when the flag is not set.

5. The input apparatus according to claim 2, further comprising an instruction section giving an instruction to capture from the detection section,
    wherein the capture section captures the detection value from the detection section when the instruction is given.

6. The input apparatus according to claim 2, wherein the operation section is the entire input apparatus.

7. The input apparatus according to claim 6, wherein the entire input apparatus is operated in a three-dimensional space.

8. The input apparatus according to claim 6, wherein the input apparatus can be attached to and detached from the electronic apparatus, and when attached to the electronic apparatus, the input apparatus is used integrally with the electronic apparatus.

9. The input apparatus according to claim 6, further comprising a button operated by the user,
    wherein the capture section further captures the detection value detected by the detection section from the detection section in a time period when an operation signal at the time of the button having been operated is not transmitted to the electronic apparatus by the radio wave.

10. A method of inputting of an input apparatus including an operation section, a detection section, a capture section, a calculation section, and a transmission section, the method comprising the steps of:
    the operation section being operated by a user for generating a corresponding value corresponding to a motion of an image displayed on a screen of an image display section of an electronic apparatus;
    the detection section detecting a detection value for generating the corresponding value corresponding to the motion of the image;
    the capture section capturing the detection value detected by the detection section from the detection section in a time period when the corresponding value is not transmitted to the electronic apparatus by a radio wave;

the calculation section calculating the corresponding value from the detection value detected by the detection section; and the transmission section transmitting the corresponding value calculated by the calculation section to the electronic apparatus by the radio wave.

11. A non-transitory computer storage medium having stored therein instructions that when executed by a computer cause the computer to perform processing comprising the steps of:

by a user's operation on an operation section for generating a corresponding value corresponding to a motion of an image displayed on a screen of an image display section of an electronic apparatus, detecting a detection value for generating the corresponding value corresponding to the motion of the image;

capturing the detected detection value in a time period when the corresponding value is not transmitted to the electronic apparatus by a radio wave;

calculating the corresponding value from the detected detection value; and transmitting the calculated corresponding value to the electronic apparatus by the radio wave.

* * * * *